United States Patent [19]
van der Lely

[11] 4,316,510
[45] Feb. 23, 1982

[54] SOIL CULTIVATING MACHINE WITH INTERCONNECTED PIVOTED MEMBERS

[76] Inventor: Cornelis van der Lely, 7 Brüchenrain, Zug, Switzerland

[21] Appl. No.: 109,149

[22] Filed: Jan. 2, 1980

[30] Foreign Application Priority Data

Jan. 11, 1979 [NL] Netherlands .................. 7900218
Apr. 6, 1979 [NL] Netherlands .................. 7902707

[51] Int. Cl.³ .......................................... A01B 15/00
[52] U.S. Cl. ................................. 172/657; 172/271; 172/311; 172/696; 172/743
[58] Field of Search ............... 172/142, 253, 271, 310, 172/311, 314, 619, 620, 630, 643, 645, 646, 657, 658, 659, 660, 694, 696, 743

[56] References Cited

U.S. PATENT DOCUMENTS

| | | | |
|---|---|---|---|
| 1,867,521 | 7/1932 | Mote ................................... | 172/657 |
| 3,049,184 | 8/1962 | Lohrman ........................ | 172/643 X |
| 3,266,579 | 8/1966 | Hofer ............................... | 172/657 X |
| 3,331,451 | 7/1967 | Zoeteman ......................... | 172/657 |
| 3,502,156 | 3/1970 | Sherman .......................... | 172/660 |
| 3,921,726 | 11/1975 | Connor et al. .................... | 172/646 |
| 4,050,522 | 9/1977 | Ralston et al. .................... | 172/311 |
| 4,147,305 | 4/1979 | Hunt ............................... | 172/271 X |
| 4,167,978 | 9/1979 | Kirchner ......................... | 172/310 |
| 4,204,579 | 5/1980 | Rau et al. ......................... | 172/657 |

FOREIGN PATENT DOCUMENTS

| | | | |
|---|---|---|---|
| 1016002 | 8/1977 | Canada ............................... | 172/657 |
| 209121 | 1/1924 | United Kingdom ................ | 172/657 |
| 930515 | 7/1963 | United Kingdom ................ | 172/142 |

*Primary Examiner*—Richard T. Stouffer
*Attorney, Agent, or Firm*—William B. Mason

[57] ABSTRACT

A soil cultivating machine has a beamed frame, and working members arranged in pairs. Two working members are mounted one behind the other, preferably on a common carrier beam which is releasably secured to transverse beams of the frame. Thus the two working members and the carrier beam constitute a working unit which is readily releasable from the frame. The two working members of the pair are interlinked by a connecting rod to ensure a uniform operating depth over irregular ground and the members can be located on opposite sides of the carrier beam as viewed in plan. In one embodiment, the working members are mounted on pivot pins journalled to different frame beams and the members are arranged in rows that are inclined to the direction of travel. The beams with working members can be arranged in groups that are hinged to one another for elevation to a reduced transport position. A wheeled central frame portion has an intermediate frame portion and an outer frame portion to each side which are linked to a respective swingable arm. The arm can be turned by a hydraulic ram so that, first, the outer portion is raised and then the intermediate portion is elevated above the central portion.

15 Claims, 17 Drawing Figures

SOIL CULTIVATING MACHINE WITH INTERCONNECTED PIVOTED MEMBERS

In soil cultivating machines, working members are usually mounted independently of one another on the machine frame so that the individual fastening of these working members often requires a relatively complicated construction, and removal is often difficult.

According to one aspect of the present invention there is provided a soil cultivating machine comprising a frame and at least two working members disposed one behind the other with respect to the intended direction of operative travel of the machine, these two working members being mounted on a common carrier to constitute a working unit which is releasably secured to the frame.

With a construction in accordance with the present invention, groups of working members can be readily mounted on or removed from the frame.

Furthermore, manufacture of the machine can take place by simple means in an uncomplicated manner so that the costs are reduced, while the reliability of the machine is not affected.

According to a second aspect of the present invention there is provided a soil cultivating machine comprising a frame and at least two working members mounted on a carrier and disposed one behind the other with respect to the intended direction of operative travel of the machine, the working members on the carrier being disposed to different sides of the carrier, which extends in the intended direction of operative travel of the machine.

For a better understanding of the present invention and to show how it may be carried into effect, reference will now be made, by way of example, to the accompanying drawings, in which.

The machine illustrated in the FIGS. 1-6 comprises two frame beams 1 and 2 which extend transversely of the intended direction of operative travel of the machine, indicated by an arrow A. The beams 1 and 2 lie one behind the other with a gap between them. Each of the beams 1 and 2 is fabricated from sheet material bent into a channel section which is disposed so that the sides of the channel extend downwards.

Figure 2:
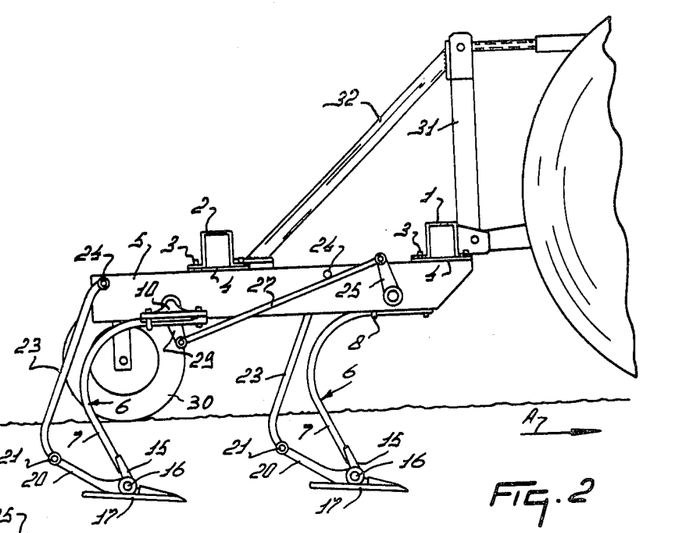
FIG. 2 is a view taken in the direction of the arrow II in FIG. 1.
Figure 3:
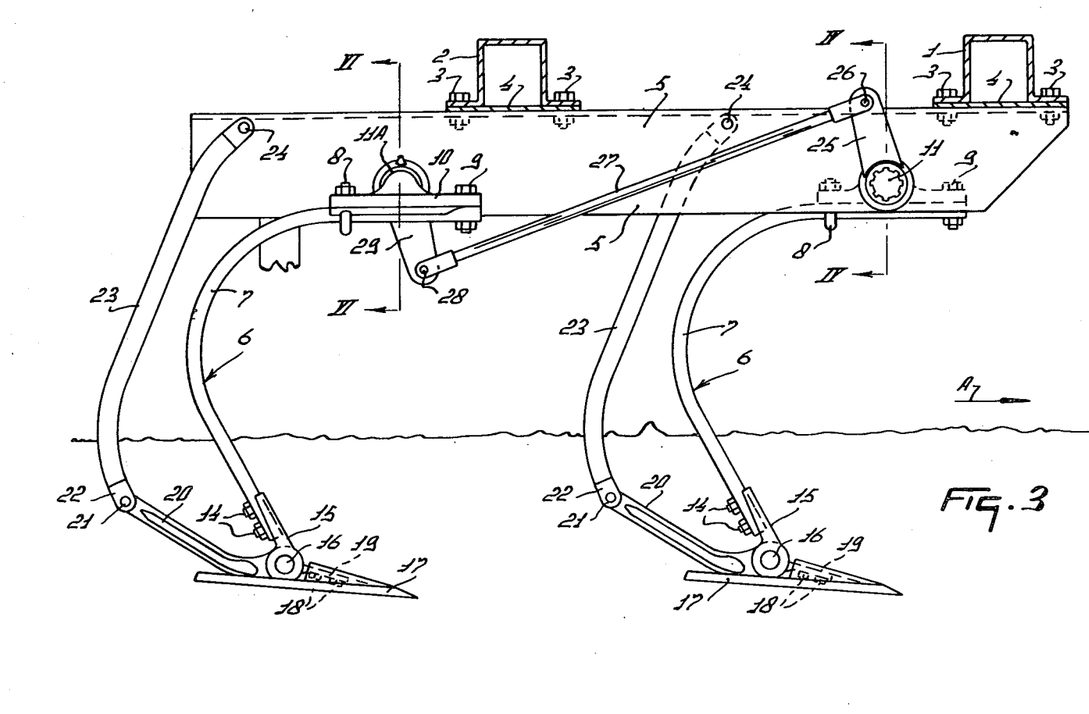
FIG. 3 is a view on an enlarged scale taken on the line III—III in FIG. 1.
Figure 4:
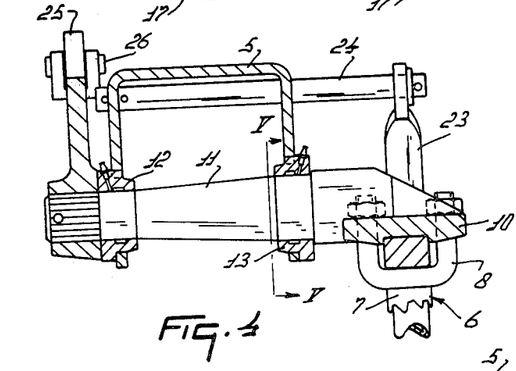
FIG. 4 is a view taken on the line IV—IV in FIG. 3.
Figure 5:
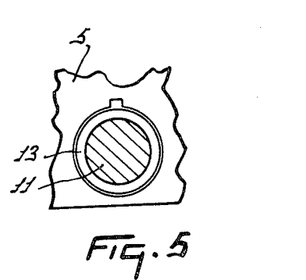
FIG. 5 is a view taken on the line V—V in FIG. 4.
Figure 6:
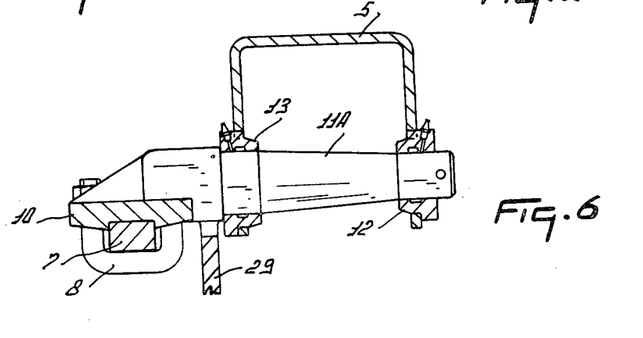
FIG. 6 is a view taken on the line VI—VI in FIG. 3.

The lower ends of the sides have outwardly directed flanges which project in a horizontal direction and are fastened by bolts 3 to a tie plate 4. Each plate 4 is fastened to a number—in this embodiment five—of carriers 5 which extend in the direction A and are each fabricated as channel sections from sheet material. The carriers 5 are disposed so that the sides of the channels extend downwards. The top side of each of the carriers 5 is releasably fastened to the plates 4 by the bolts 3. At the front, the sides of the carriers 5 are bevelled, as shown in FIGS. 2 and 3, so that remnants of plants and roots will not stick to the frame. Each of the carriers 5 is provided with soil working members 6 which are pivotably mounted one behind the other. Each lightweight carrier 5 of sheet material together with its working members 6 consititutes a working unit which is readily releasable from the rest of the machine.

Figure 1:
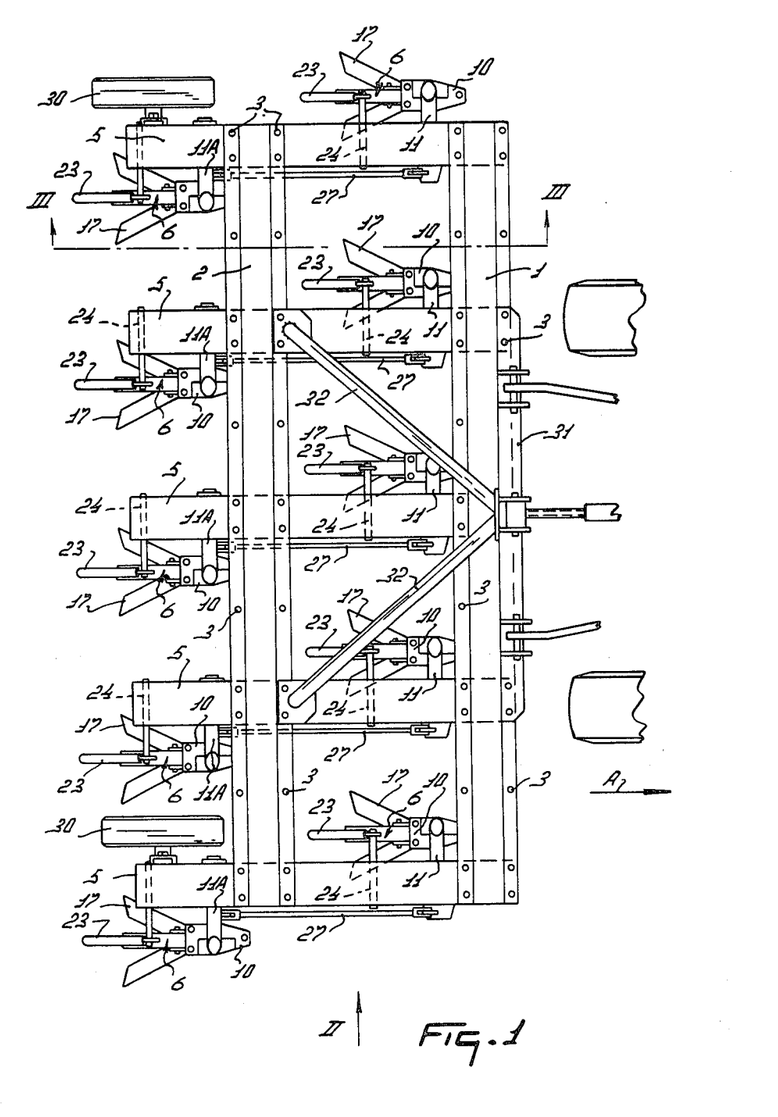
FIG. 1 is a plan view of a soil cultivating machine.

From FIG. 1 it will be appreciated that the working members 6 are located on opposite sides of the respective carrier 5 and, as viewed on plan, their fastening points are seen to be located directly behind the frame beams 1 and 2 respectively. Each working member 6 comprises a supporting arm 7 having a horizontal fastening portion connected by a uniformly curved portion to a substantially straight portion which slopes towards the front from top to bottom. The fastening portion of each supporting arm 7 is fixed by clamping brackets 8 and bolts 9 to a supporting element 10 which extends in the direction A (FIG. 3) and which is integral with a stub shaft 11 (front working member) or 11A (rear working member) extending transversely of the direction A. The stub shafts 11 and 11A are freely rotatably supported in bearings 12 and 13 respectively provided in the sides of the carriers 5. The bearings 12 and 13 are provided with nipples for supplying lubricating fluid.

A support 15 is releasably fastened by bolts 14 to the lower end of each supporting arm 7 of each working member 6. A cultivating member 17 is pivotally connected to the support 15 by a pin 16 extending transversely of the direction A. The cultivating member 17 is in the form of a V-shaped plate and is fastened to a forwardly inclined supporting part 19 by bolts 18. To the rear of the supporting part 19 there is a rearwardly directed control arm 20 which slopes upwardly from front to rear. At the end away from the supporting part 19, the arm 20 is pivotally connected, by a pin 21 which extends transversely of the direction A, between the arms of a fork 22 fitted to the lower end of a control link 23, the other end of which is freely pivotably connected between the sides of the respective carrier 5 by means of a fork and a pin 24 which extends transversely of the direction A. The distance between the axes of the pins 16 and 21 is substantially equal to the distance between the axis of the stub shaft 11 or 11A and the axis of the pin 24. At its ends the control link 23 bends forwardly, but it is substantially straight between these ends (see FIGS. 2 and 3). The pivotal connection between the control link 23 and the carrier 5 is located near the top side of the carrier 5 and, as will be appreciated from FIG. 2, is located at a higher level than the pivotal connection between the supporting arm 7 and the carrier 5. The stub shaft 11 affording the pivotal connection to the carrier 5 of the supporting arm 7 of the leading working member 6 is provided at the end away from the supporting arm 7 with an upwardly extending crank arm 25, which is pivotally connected by a pin 26 between the arms of a fork on one end of a connecting rod 27, which extends rearwardly from the crank arm 25A and which slopes downwardly from front to rear. At the other end of the connecting rod 27 there is a fork which is pivotally connected by a pin 28 to a crank arm 29 on the stub shaft 11A, this crank arm 29 extending downwardly from the stub shaft 11A.

The outermost carriers 5, which project beyond the trailing frame beam 2 (see FIG. 1), are provided with ground wheels 30, which are vertically adjustable. Each ground wheel 30 is located on the opposite side of the carrier 5 from the respective trailing working member 6. The front of the leading frame beam 1 is provided with a trestle 31, by which the machine can be coupled with the three-point lifting device of a tractor. The top of the trestle 31 is connected to the trailing frame beam 2 by downwardly inclined, diverging supports 32.

For operation, the machine is hitched to the three-point lifting device of the tractor by the trestle 31 and the machine can be drawn by the tractor in the direction A. Each cultivating member 17 then occupies a position as shown in FIGS. 2 and 3, the tip pointing slightly downwards, the cultivating member being at an angle of about 5° to the horizontal.

During movement across the soil, for example at the depth of stubble, the cultivating members 17 can effectively tear loose weeds and stubble. The position occupied by the intercoupled working members 6 in normal operation is illustrated in FIG. 3. This position may be considered to be a mean position from which the working members deflect under the action of constantly varying forces. The working members 6 will pivot about the axes of the stub shafts 11 and 11A until the forces exerted in the connecting rod 27 and the crank arms 25 and 29 are in equilibrium.

In FIG. 3, the crank arms 25 and 29 are shown as being substantially parallel to one another in the mean operative position. The equilibrium of forces between the intercoupled working members 6 automatically ensures a uniform working depth being maintained. If the leading working member works at a smaller depth, for example, upon encountering a depression in the soil, the force exerted on that working member decreases and the force exerted by the trailing working member through the connecting rod 27 causes the leading working member 6 to penetrate to a greater depth into the soil, so maintaining the working depth. When the leading working member reaches the end of the depression and penetrates more deeply into the soil, it applies an increased force to the connecting rod 27 so that the trailing working member, than arriving at the depression, also works more deeply. When the supporting arm 7 of a working member 6 turns to the rear about the axis of the stub shaft 11 or 11A, the control link 23 acting on the arm 20, causes the supporting part 19 to pivot with respect to the lower end of the supporting arm 7 so that the attitude of the cultivating member 17 is substantially maintained. In this way it is ensured, that the attitude of the cultivating member 17 will not adversely affect the above-mentioned play of forces, which might otherwise happen if under unfavourable conditions during deflection of a supporting arm 7 the cultivating member 17 of one working member 6 should take up an attitude different considerably from that of the other working member. Since each supporting element 10, to which the fastening portion of the supporting arm 7 of the respective working member 6 is connected, is integral with the stub shaft 11 or 11A, the construction is simple. Furthermore, since each individual carrier 5 of channel-section sheet material carries two working members, the assembly can be constructed in a simple manner by fitting together these working units. Each of the carriers 5 with its working members 6 can be removed as a unit from the beams 1 and 2 simply by undoing the bolts 3, and can then be replaced in the event of damage or the distance between the working members of the unit can be altered to match the distances between rows of plants.

Figure 7:
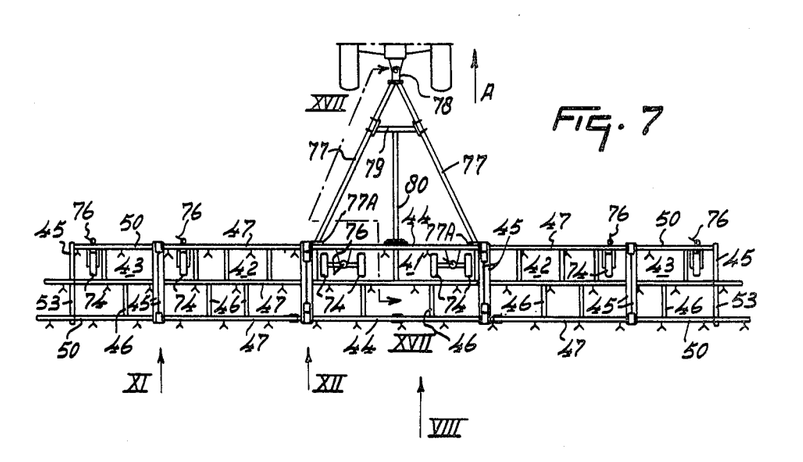
FIG. 7 is a schematic plan view of a soil cultivating machine in accordance with the invention.
Figures 9, 10:
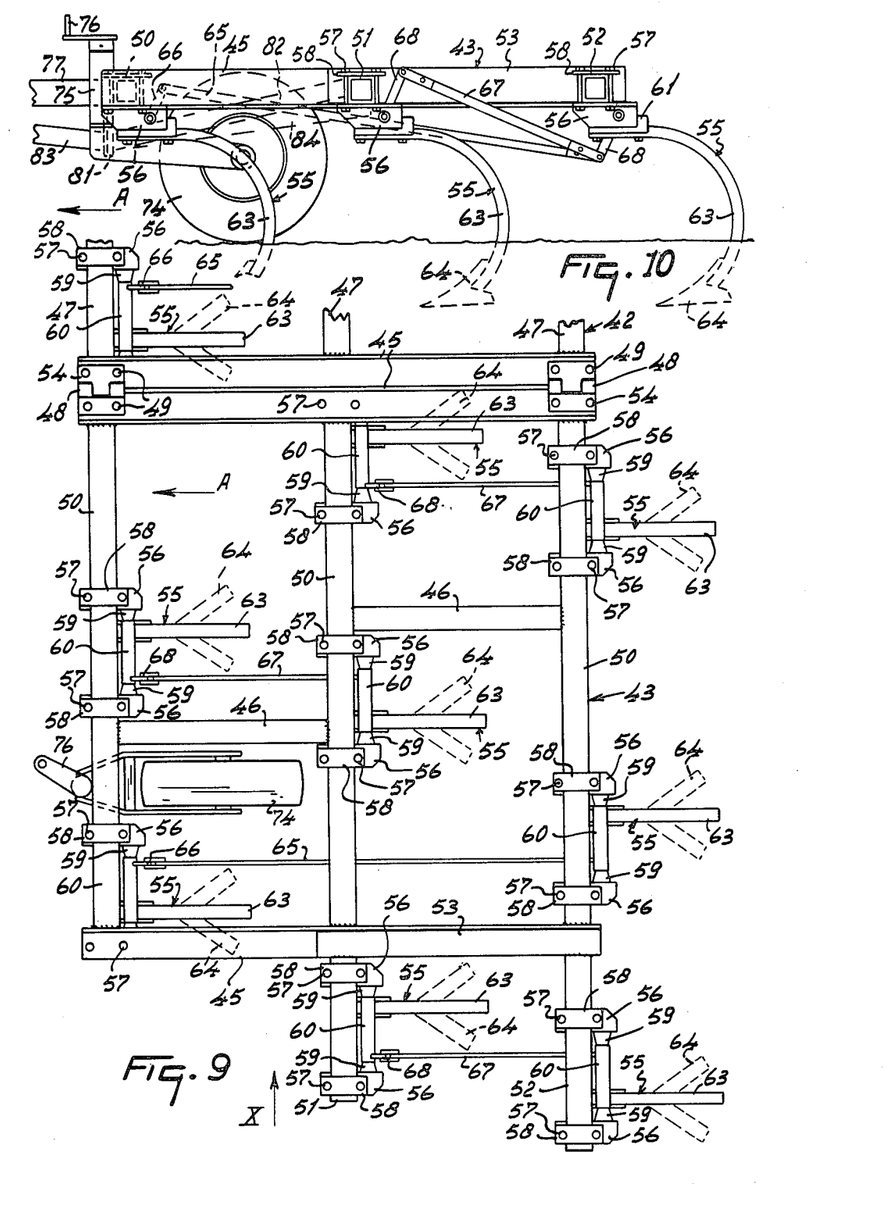
FIG. 9 is an enlarged plan view of an outermost portion provided with tines and of part of a pivotable intermediate frame portion of the machine in accordance with FIG. 7.
FIG. 10 is an elevational view in the direction of the arrow X in FIG. 9.
Figure 16:
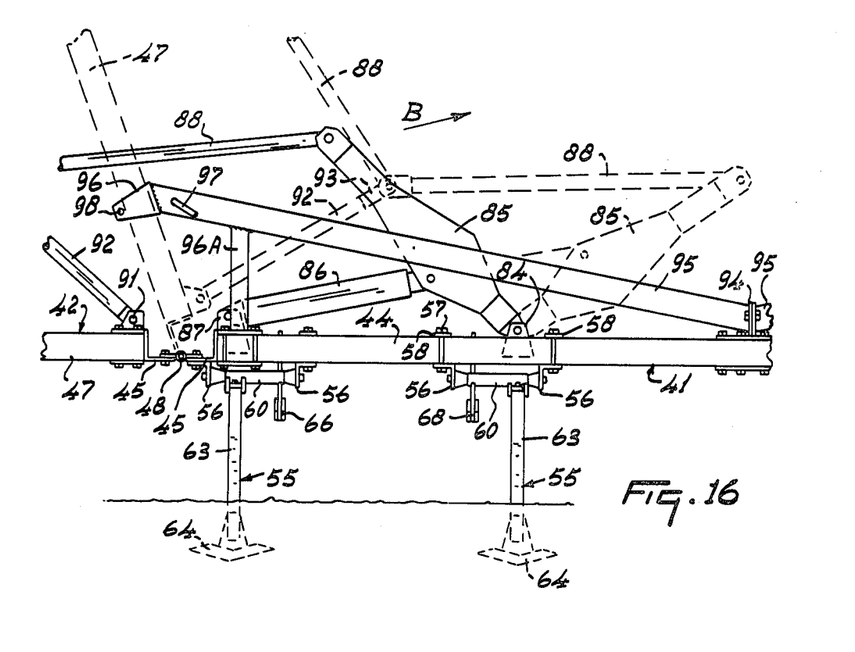
FIG. 16 shows on an enlarged scale a detail of FIG. 8 comprising the lifting means for turning the respective portions of the machine into the transport position and FIG. 17 shows on an enlarged scale part of an elevational view taken on the line XVII—XVII in FIG. 7.
Figure 17:
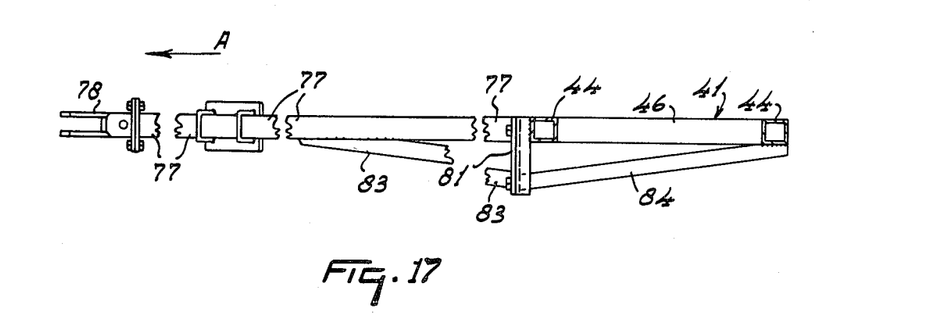

The device illustrated in FIGS. 7–17, is a soil cultivating machine comprising a plurality of frame portions disposed side by side, viewed with respect to the direction of movement A of the machine, and pivotally connected with one another. A central frame portion 41, which has the largest width, is pivoted at its ends to two shorter intermediate frame portions 42, which in turn are pivoted on the sides remote from the central frame portion 41 to an outermost frame portion 43. The width of the outermost frame portions 43 is approximately equal to half the width of the central frame portion 41. The central frame portion 41 comprises three equally spaced, parallel beams 44 extending transversely of the direction of movement A. At the ends the respective beams 44 are interconnected by means of transverse beams 45 formed by angle-section irons. An upright limb of each angle-section iron 45 is welded to the ends of the respective beams 44 in a manner such that the lying limb is located at the level of the lower side of the beams (FIG. 16). Near the center and the ends the foremost beam 44 of the frame portion 41 is connected by means of a tie beam 46 with the central beam 44, whereas the central beam 44 and and the hindmost beam 44 are interconnected by tie beams 46 spaced apart from the center and the ends by equal distances. Each of the intermediate frame portions 42 located on either side of the central frame portion 41 comprises three beams 47 arranged in the same manner as in the central frame portion 41. The beams 47, however, are shorter. Like the beams 44 of the central frame portion 41 the beams 47 are interconnected at the ends by means of angle-section irons 45 and between the ends by means of tie beams 46. On their proximal sides the frame portions 41 and 42 are pivoted to one another by two hinges 48 lying one behind the other near the front and rear ends respectively of the angle-section irons 45. Each of the hinges 48 is fastened by means of bolts 49 to the lying limb of an angle-section iron 45. It is ensured in this manner that the respective hinges are located between the upright limbs of the angle section irons 45 located at the ends of the aligned beams 44 and 47 of the frame portions 41 and 42. In the shorter outermost frame portions 43 tie beams 46 are also arranged between the beams 50. At the outermost frame portions 43 the beams 50 are also interconnected at their ends by means of angle-sections irons 45. Near the center and near the rear end each outermost angle-section iron is provided with a carrier 51 and 52 respectively in line with the central and hindmost beam 50 respectively, said carriers being provided in a manner to be described hereinafter with cultivator tines. The carrier 51 is longer than the carrier 52 (FIG. 9). On the top side the carriers 51 and 52 are interconnected by a support 53 also connected with an angle-section iron 45. On their proximal sides the limbs of the angle-section iron 45 facing one another in the frame portions 42 and 43 are pivoted to one another by means of hinges 54 arranged at the ends. The beams 50 are also in line with the beams 47 (FIG. 7). The beams 44, 47, 50 of the above-described frame portions 41, 42 and 43, which are in line with one another during operation, are provided with cultivator tines 55. The tines 55 are distributed in a manner such that the pattern is obtained which is shown schematically in FIG. 7 and in part in FIG. 9, the tines being arranged in groups. Each group comprises three sequential tines arranged in a row inclined to the direction of movement A of the machine so that the respective rows are parallel to one another and the tines are disposed in staggered positions. In the embodiment shown the respective rows extend, viewed in the direction of movement from left to right in forwardly inclined positions.

Figure 11:
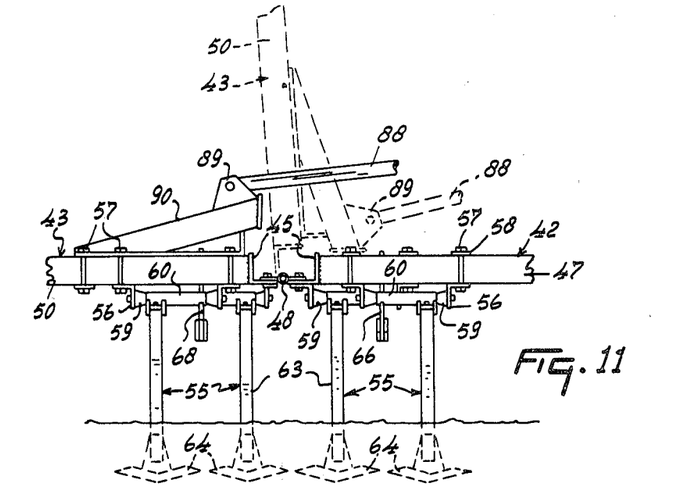
FIG. 11 is an enlarged elevational view in the direction of the direction of the arrow XI in FIG. 7.
Figure 12:
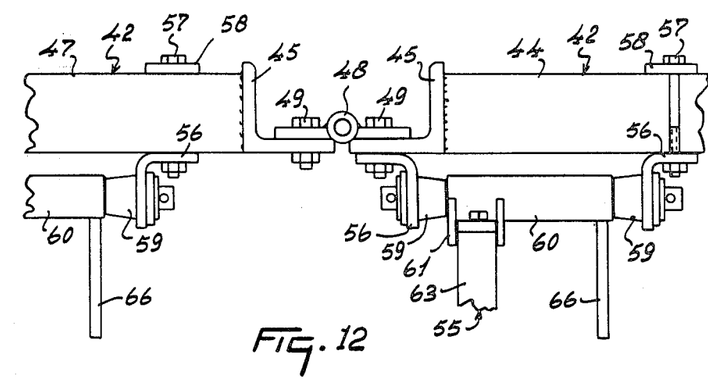
FIG. 12 is a partial, enlarged elevational view in the direction of the arrow XII in FIG. 7.

The connection of each tine 5 includes two relatively spaced supports 56 extending in the direction of movement A and being arranged on the lower side of a beam 44, 47, 50 respectively and a carrier 51 and 52 respectively, said supports being fixed in place by means of bolts 57 and clamping pieces 58. At the ends of the beams 44 and 47 the tines located near the front and rear sides are supported by supports 56, which are fastened by means of the bolts 49 for the hinges 48 and 54 respectively (FIGS. 11 and 12).

In the respective supports 56 (FIG. 12) a pin 60 extending transversely of the direction of movement A is journalled in synthetic resin bearings 59. Between the synthetic resin bearings 50 the pin 60 has a thickened portion and is held in place by means of guard pins. The thickened portion of each pin 60 is provided near one end on the lower side with a fastening portion 61 having downwardly extending limbs, between which is arranged the horizontal top end of a curved, rearwardly extending carrier 63 of a cultivator tine 55 (FIG. 10). On the lower side the carrier 63 is inclined downwardly and forwardly and is provided at this place with a cultivating member 64 in the form of a goose foot.

Figure 13:
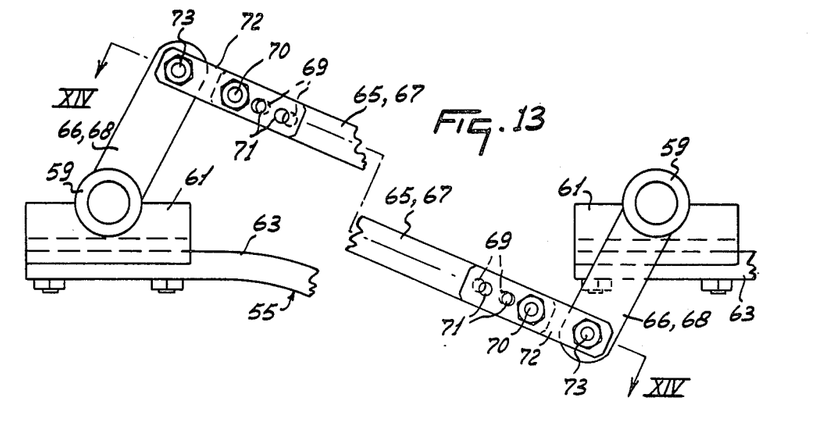
FIG. 13 shows on an enlarged scale the connection between two tines of a group, lying one behind the other.
Figure 14:
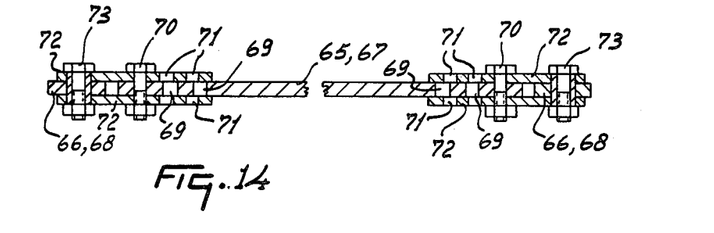
FIG. 14 is an elevational view taken on the line XIV—XIV in FIG. 13.

As will be seen from FIG. 9 neighbouring tines are arranged so that connections of the carrier 63 on the thickened portions of the pins 60 are in specular positions. Starting from the outermost group of tines shown in FIG. 9 the pins 60 of the pivotable support for the foremost tines are connected, in alternating groups of tines, with the pins of the support for the rearmost tines of the neighbouring group by means of a tie rod 65, which is pivotally arranged between an upwardly extending arm and a downwardly extending arm 66 on the pin 60 of the support for the foremost and rearmost tines 55 respectively of a pair of interconnecting tines. The hinge pin 60 for the carriers 63 of the further tines of the respective groups arranged on the foremost and central beams and the central and rearmost beams of the frame portions 43, 42, 41,42,43 respectively are interconnected by means of a tie rod 67 and arms 68 in an identical manner. The tie rod 65 and 67 respectively (FIGS. 13 and 14) has at its end three equally spaced apart holes 69, through each of which a bolt 70 can be passed. The bolt 70 can furthermore be inserted into one of three holes 71 in relatively spaced supports 72 for arranging a rod. The supports 72 are pivoted by means of a bolt 73 to an arm 66 on a pin 60. The distance between the holes 71 in the supports 72 is smaller than the distance between the respective holes 69 in a rod 65 and 67 respectively so that various adjustments for the rod are possible and hence the distance between the arms 66 and 68 respectively on the hinge pins 60 of the pivotable supports for the interconnected tines 55 can be shortened or enlarged respectively, the relative positions of the intercoupled tines being thus variable.

Figure 15:
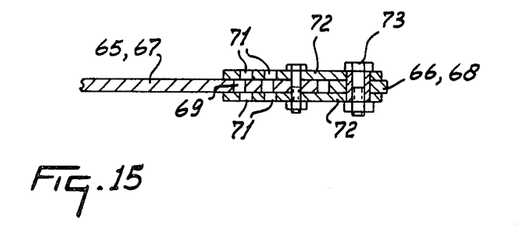
FIG. 15 is a partial elevational view taken on the line XV—XV in FIG. 13, in which the connection between the tines includes at least one shear bolt.

In a preferred embodiment of the invention the bolt 70 or bolts 70 connecting the rod 65 or 67 respectively with the supports 72 may be formed by a shear bolt. If a shear bolt is used the holes in the supports 72 and the rod may have a smaller diameter (FIG. 15). The central frame portion 41 is supported on either side of its center by a pair of ground wheels 74, which are disposed between the foremost and central beams 44. The intermediate frame portions 2 and the outermost frame portions 3 are provided on the sides remote from the central frame portion 41 with one ground wheel 74 between the foremost and central beams 47 and 50 respectively. Each pair of ground wheels 74 or each ground wheel 77 respectively is adjustable in a direction of height by means of a non-rotatable carrier in a sleeve 75. The adjustment of the ground wheels may be performed in a manner not shown, for example, by means of a spindle 76 (FIG. 10). The foremost frame beam 44 of the central frame portion 41 is provided at the ends at the side of the angle-section irons 45 with a support 77A, to which a forwardly extending beam 77 is secured. The beams 77 are converging (FIG. 7) and are interconnected at the front by means of a draw ring 78. At a given distance behind the draw ring 78 a transverse beam 79 is arranged between the beams 77. The center of the transverse beam 79 is connected with a rearwardly extending supporting beam 80, which is connected by means of a support 81 with the center of the foremost beam 44. Each support 77A is connected by means of a strut 82 with the central beam 44 (FIG. 10). On the lower side the support 81 is connected by means of a strut 83 with the lower side of the beam 80 and by means of a strut 88 with the lower side of the central beam 44.

Figure 8:
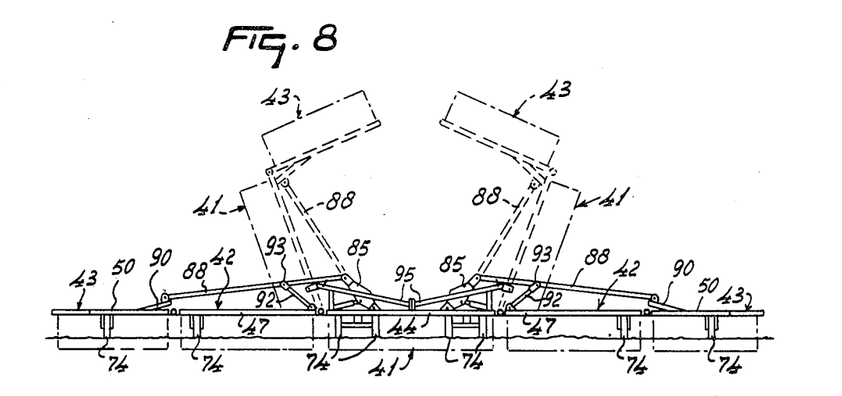
FIG. 8 is an elevational view in the direction of the arrow VIII in FIG. 7, the transport position of the machine being indicated by broken lines.

At a distance from the center the central beam 44 of the central frame portion 41 has pivoted to it by means of ears 84 arms 85 consisting essentially of two relatively spaced portions. The portions of each arm 85 are widened near the center and pivoted to one end of a hydraulic ram 86. The other end of the ram 86 is pivotally arranged between ears 87 on the top side at the end of the beam 44. The top end of each arm 85 is pivoted to a drawbar 88, the other end of which is pivotally arranged between ears 89 on supports 90 secured to the central beam 50 of the outermost frame portion 43. The supports 90 are arranged on the pivotally connected side of the frame portion 43 (FIGS. 8 and 11). On the side facing the central frame portion 41 the central beam 47 of each intermediate frame portion 42 is provided with ears 91, between which is pivotally arranged an upwardly and outwardly inclined arm 92, the other end of which is pivotally connected by means of a fork-shaped part 93 with the drawbar 88.

From FIGS. 8 and 16 it will be apparent that during the operation of the device the arm 85 on the central frame portion 41 is at least substantially parallel to the arm 92 on the intermediate frame portion 42. Near the center of the hindmost beam 44 of the central frame portion 41 are arranged by means of supports 94 upwardly and outwardly inclined supporting beams 95, which bear near the ends of the beam 44 on upwardly extending supports 96A and which each extend as far as beyond said supports. At the end each of the supporting beams 95 is provided with a fork-shaped part 96 so that the hindmost beam of the pivotable intermediate frame portion 42 can be held between the prongs of said fork while the assembly can be fixed in place by means of a locking pin 97, which can be passed through holes 98 in the limbs of the bracket-shaped part 96. During operation the pin 97 is located in a hole in the supporting beam 95 (FIG. 16).

The device described above operates as follows.

During operation the device is coupled by means of the drawbar formed by the beams 77, 79 and 80 and by the draw ring 78 with the rear side of a tractor and the device is moved in the direction of the arrow A. The cultivating members 63 of the respective tines 55 then pass through the soil at a given depth determined by the ground wheels 74. The intercoupled pairs of tines 55 provided on the respective frame portions are in a state of equilibrium, out of which they may move to the front or to the rear when the resistance of the soil increases. Such an increase in resistance may be caused by unevennesses of the soil or by an obstacle, for example, a root or a stone. A movement of one tine will result in a movement of the other tine in the opposite direction with the aid of the adjustable connection between the two tines of one pair. The relative positions of the tines may be varied at will and if a shear bolt is provided the connection between the tines of a pair is interrupted in the event of an excessive load, so that damage is avoided.

In order to change over the device to a transport position the respective wheels 74 supporting the central frame portion are set by means of the spindle 76 in a manner such that the tines of the central frame portion 41 get out of contact with the ground. Then the respective arms 85 pivotally arranged on the central frame portion 41 can be turned in the direction of the arrow B by means of the hydraulic rams 86 (FIG. 16). During this turn initially only the outermost central portion 43 will move upwardly about the pivotal axes of the hinges 54 extending in the direction of movement A into the position shown in FIG. 11 by broken lines. When the outermost frame portion attains the upwardly tilted position the intermediate frame portion 42 will also move upwardly to attain the final position shown in FIGS. 8 and 16. In this position the hindmost beam 47 of the intermediate frame portion 42 can be locked in place by means of the pin 97.

The invention is not limited to the statements made in the description and/or the claims but also relates to the details of the Figures which may not have been described.

I claim:

1. A soil cultivating machine comprising a frame and at least two soil working members being mounted on a common beam of said frame, one behind the other with respect to the normal direction of machine travel and on opposite sides of said beam, said two members being linked to one another and detachably fastened with said beam as a unit to the remainder of the frame, said common beam extending in the direction of travel and bridging two transverse frame beams, said common beam being a channel beam with sides and said members being located adjacent a respective beam side, each working member comprising a supporting arm and said arm having an upper end pivotally connected to said common beam, said upper end being fastened to stub shaft means that comprises a stub shaft journalled to the sides of said common beam.

2. A soil cultivating machine as claimed in claim 1, in which each of the two frame beams comprises a channel section with the sides of the channel directed downwardly, the lower ends of said sides having outwardly directed horizontal flanges fastened to said common beam by bolt means.

3. A soil cultivating machine as claimed in claim 1, in which said stub shaft is supported in bearings with means for lubrication.

4. A soil cultivating machine as claimed in claim 1, in which the lower end of said supporting arm is pivoted to a cultivating tool.

5. A soil cultivating machine as claimed in claim 4, in which the rear portion of said tool is pivotally connected to a control link, said link being pivotally mounted on said common beam behind said supporting arm.

6. A soil cultivating machine as claimed in claim 5, in which said link is connected to a pivot pin that extends between the sides of said common beam at a higher level than the connection between said supporting arm and that beam.

7. A soil cultivating machine as claimed in claim 6, in which at least the major portion of said link is substantially straight.

8. A soil cultivating machine as claimed in claim 7, in which the pivotal connection between said link and tool is behind the pivotal connection between said supporting arm and the tool by a distance between that of the connection of said link with the common beam and that of the connection of the latter with said supporting arm.

9. A soil cultivating machine as claimed in claim 7, in which said tool is a shoe that normally extends at an angle of about 5° to the horizontal.

10. A soil cultivating machine as claimed in claim 1, in which the shafts of said two working members have crank arms that are interconnected by a connecting rod.

11. A soil cultivating machine as claimed in claim 10, in which the crank arm on the stub shaft of the leading working member extends upwardly from that stub shaft, the crank arm on the stub shaft of the trailing working member extending downwardly from that stub shaft.

12. A soil cultivating machine as claimed in claim 1, in which there are a plurality of spaced apart beams which extend in the direction of travel and each of said spaced apart beams mounts two working members.

13. A soil cultivating machine comprising a beamed frame and a plurality of cultivating tools being mounted on said frame, said tools being mounted in pairs one behind the other with respect to the direction of machine travel, each of said tools including an upwardly extending carrier and the respective carriers of the tools in each pair being pivoted to one another by a tie rod, each carrier being pivoted to the frame with a pivot pin that extends transverse to the direction of travel and said pin mounting a crank arm, said tie rod interconnecting the crank arms of the tools of each pair, said tools being arranged in at least three rows wherein a foremost tool is connected to a hindmost tool and an adjacent central tool is connected to either a foremost or a hindmost tool.

14. A soil cultivating machine as claimed in claim 13, in which the tie rod and crank arm connections are adjustable, at least one end of said tie rod having a plurality of holes along the length thereof, the corresponding crank arm comprising an apertured support section that is connectable to any of the holes of said tie rod end by a fastener.

15. A soil cultivating machine as claimed in claim 14, in which said apertured support section has a plurality of apertures and the distances between the holes in the tie rod differ from the distances between said apertures.

* * * * *